(12) United States Patent
Karamuk et al.

(10) Patent No.: US 9,521,495 B2
(45) Date of Patent: Dec. 13, 2016

(54) CIC HEARING AID SEAL AND METHOD OF MANUFACTURING THE SAME (71) Applicant: Sonova AG, Stäfa (CH)

(72) Inventors: Erdal Karamuk, Maennedorf (CH); Stuart Wenzel, San Carlos, CA (US)

(73) Assignee: Sonova AG, Staefa (CH)

( * ) Notice: Subject to any disclaimer, the term of this patent is extended or adjusted under 35 U.S.C. 154(b) by 0 days.

(21) Appl. No.: 14/428,701

(22) PCT Filed: Sep. 17, 2012

(86) PCT No.: PCT/EP2012/068209
§ 371 (c)(1),
(2) Date: Mar. 17, 2015

(87) PCT Pub. No.: WO2014/040649
PCT Pub. Date: Mar. 20, 2014

(65) Prior Publication Data
US 2015/0281861 A1    Oct. 1, 2015

(51) Int. Cl.
*H04R 25/00* (2006.01)
*B29C 43/00* (2006.01)
(Continued)

(52) U.S. Cl.
CPC ........... *H04R 25/652* (2013.01); *B29C 43/003* (2013.01); *B29C 43/027* (2013.01); *B29C 43/32* (2013.01); *B29C 45/0001* (2013.01); *B29C 45/0055* (2013.01); *B29C 45/1671* (2013.01); *F16J 15/04* (2013.01); *H04R 25/02* (2013.01); *H04R 25/608* (2013.01); *H04R 25/658* (2013.01); *B29C 2045/0058* (2013.01);
(Continued)

(58) Field of Classification Search
CPC ....... H04R 25/652; H04R 25/02; H04R 25/00; B29C 43/00; B29C 43/32; B29C 43/02; B29C 45/00; B29C 45/16
USPC .................................. 381/328, 322; 181/135
See application file for complete search history.

(56) References Cited

U.S. PATENT DOCUMENTS 4,852,684 A * 8/1989 Packard ................... A61B 7/02
                                                  128/864
4,859,712 A   8/1989 Cox
(Continued)

FOREIGN PATENT DOCUMENTS

EP     1 003 443 B1    1/2004
WO    2009/061672 A1   5/2009

*Primary Examiner* — Sunita Joshi
(74) *Attorney, Agent, or Firm* — David S. Safran (57) ABSTRACT A method of manufacturing an acoustic seal for a CIC hearing aid has the steps of: embedding sacrificial particles of 50 μm to 250 μm into a silicone rubber matrix, the concentration and size of the sacrificial particles being selected to achieve a porosity of at least 40%; molding the silicone rubber matrix using a mold and curing the silicone rubber matrix; removing the sacrificial particles from the silicone rubber matrix by leaching out the sacrificial particles in a solvent; and drying the silicone rubber matrix. The seal is to surround at least part of the hearing aid and by selection of the size and/or concentration and/or the distribution of the sacrificial particles, to provide for an acoustic attenuation of at least 20 dB in a frequency range between 200 Hz and 6 kHz, with a compliance of at least 50 mm/N when the hearing aid is inserted into the ear canal.

25 Claims, 5 Drawing Sheets (51) Int. Cl.
*B29C 43/02* (2006.01)
*B29C 43/32* (2006.01)
*B29C 45/00* (2006.01)
*B29C 45/16* (2006.01)
*F16J 15/04* (2006.01)
*H04R 25/02* (2006.01)
*A61B 7/02* (2006.01)
*B29K 83/00* (2006.01)
*B29K 105/04* (2006.01)
*B29L 31/26* (2006.01)

(52) U.S. Cl.
CPC ............... *B29C 2045/0091* (2013.01); *B29C 2045/1673* (2013.01); *B29K 2083/005* (2013.01); *B29K 2105/041* (2013.01); *B29K 2995/0002* (2013.01); *B29L 2031/26* (2013.01); *H04R 25/456* (2013.01); *H04R 2225/023* (2013.01); *H04R 2460/15* (2013.01)

(56) References Cited

U.S. PATENT DOCUMENTS

| | | | |
|---|---|---|---|
| 4,969,906 A | 11/1990 | Kronman | |
| 5,007,929 A | 4/1991 | Quaid | |
| 5,514,378 A * | 5/1996 | Mikos | ............... A61F 2/4241 |
| | | | 424/425 |
| 5,998,185 A | 12/1999 | Fuller et al. | |
| 6,391,233 B1 * | 5/2002 | Otani | ............... B29C 67/202 |
| | | | 264/344 |
| 6,900,055 B1 | 5/2005 | Fuller et al. | |
| 7,113,611 B2 | 9/2006 | Leedom et al. | |
| 7,580,537 B2 | 8/2009 | Urso et al. | |
| 7,664,282 B2 * | 2/2010 | Urso | ............... H04R 25/656 |
| | | | 181/135 |
| 7,720,242 B2 | 5/2010 | Anderson et al. | |
| 2006/0291682 A1 | 12/2006 | Urso et al. | |
| 2011/0093069 A1 | 4/2011 | Goraltchouk et al. | |

* cited by examiner

CIC HEARING AID SEAL AND METHOD OF MANUFACTURING THE SAME

BACKGROUND OF THE INVENTION

Field of the Invention

The invention relates to a seal for retaining a CIC (completely-in-the-canal) hearing aid within portion of the ear canal by contact with the wall of the ear canal.

Description of Related Art

According to one example, such a hearing aid comprises a lateral module, a medial module and a flexible joint assembly connecting the medial module and the lateral module in such a manner that the lateral module and the medial module are movable relative to each other in order to follow the shape of the ear canal ("medial" designates the direction towards the tympanic membrane, and "lateral" designates the direction away from the tympanic membrane). According to one example, the medial module contains the hearing aid loudspeaker, while the lateral module includes the battery, the microphone and the audio signal processing electronics including an amplifier; alternatively, a third module may be provided which is connected to the lateral module and which includes one or more of these hearing aid components.

According to another example, the hearing aid comprises only a single module which includes all of the hearing aid components.

In general, CIC hearing aids of these types can be inserted very deeply into the ear canal, so that the loudspeaker can be located very close to the ear drum (a typical distance is 4 mm). Typically, such types of hearing aid (which is also known as "extended wear hearing aid) is designed to be worn within the ear canal for a few months without the need to replace the battery; such "extended wear" is achieved by minimizing power consumption.

Typically, the lateral module is primarily located in the cartilaginous part of the ear canal, while the medial module is primarily located in the bony part of the ear canal.

Such CIC hearing aids are provided with an acoustic seal surrounding the part of the hearing aid for retaining the hearing aid within the ear canal and for providing for an acoustic seal in order to prevent feedback by acoustically decoupling the hearing aid microphone and the hearing aid speaker. Such acoustic seal is made of a soft and resilient material in order to allow compression of the seal when the hearing aid is inserted into the ear canal. In particular, the hearing aid and the seal have to be designed such that the local pressure exerted on the ear canal wall is not too high; in particular, the local pressure should be smaller than the venous capillary return pressure (which is 12 mm Hg).

A hearing aid of this type is described, for example, in U.S. Pat. No. 7,580,537 B2, wherein the lateral module or both the lateral and the medial module are provided with a dome-shaped sealing retainer which is fabricated from an elastomeric foam, in particular a polyurethane foam; other examples mentioned therein are silicones, polyethylenes, fluoropolymers and copolymers thereof. It is also mentioned that all or a portion of the seal may comprise a hydrophobic layer or coating which may be made of silicones or fluoropolymers. A similar hearing aid is described in U.S. Pat. No. 7,664,282 B2.

Such seals made of hydrophilic polyurethane foam usually are net-shape molded. However, the surface to volume ratio of such seals is in disfavor of such a reaction molding method, since such reactions are usually rather fast and thus difficult to control in a very limited volume. Many parameters in such process, such as the ratio of A/B components of the polyurethane foam, the temperature of the components, the shear rate of mixing, environmental temperature and humidity, amount of mixture poured into the mold, surface properties (roughness, wettability) and temperature of the mold and the time from filling to closing of the mold (shut-off time), play a critical role for the quality of the foam, such as for the size and distribution of the pores, the skin thickness and the material density. Typically, several sizes of such seals are required for a hearing aid, so that these parameters have to be identified and controlled for each design. Furthermore, such reactive foaming process has limitations concerning minimal wall thickness or minimal feature size. In view of the usually relatively tight specifications concerning properties of the retainer seal, such reactive foaming manufacturing process has to be followed by various measurement steps, for example, concerning size, flexibility and acoustic attenuation, which limit throughput of the manufacturing site and increase cost.

It is known to produce parts made of thermoplastic elastomers and silicone rubbers by physical foaming, wherein a highly pressurized gas is injected into the molten or yet uncured polymer; thus, a porous structure is created by controlled expansion in a mold. Examples of such processes are a process by Trexel Inc., Wilmington, USA, labeled "MuCell", and process by Sulzer AG, Winterthur, Switzerland, labeled "OptiFoam". However, also these processes include limitations concerning the manufacturing of small parts with minimal wall thickness and an adverse surface to volume ratio.

U.S. Pat. No. 7,113,611 B2 relates to a hearing aid comprising an ear mold having a tip which is made from an injection moldable, bio-compatible thermo-elastomer, such as C-flex, or a castable, bio-compatible silicone polymer.

It is also known that porous silicone or silicone rubber structures can be produced by embedding sacrificial particles into an elastomeric matrix prior to curing of the elastomeric matrix and subsequently leaching/washing the particles, after curing, out of the elastomeric matrix, thereby generating a porous structure. It is known that such porous structures may be used as medical implants or as a substrate for growth of cells or living tissue.

Examples for the use of such porous silicone as a substrate for cells are described in U.S. Pat. Nos. 5,514,378, 5,998, 185 and 6,900,055 B1.

Examples for the use of such porous silicone structures for manufacturing of implants to the human body are described in U.S. Pat. Nos. 4,969,906, 5,007,929, 4,859,712, U.S. Patent Application Publication 2011/0093069 A1, PCT Patent Application Publication WO 2009/061672 A1 and U.S. Patent Application EP 1 003 443 B1. According to U.S. Pat. No. 4,969,906, the sacrificial particles may be sodium chloride crystals having a diameter from 50 to 200 µm; such particles can be removed by water.

U.S. Pat. No. 6,391,233 B1 relates to a porous polymeric material having a porosity of more than 50%, wherein meltable organic particles melting at 100° C. to 300° C. are embedded in a polymeric matrix for generating pores. The pore-forming particles melt during the molding process, with the molded products being soaked with a solvent which dissolves the pore-forming organic material. It is mentioned that such process may be used for forming an ear plug.

SUMMARY OF THE INVENTION

It is an object of the invention to provide a method of manufacturing an acoustic seal for retaining a CIC hearing aid within the ear canal, wherein the method should enable reliable control of physical properties of the seal, in particular with regard to the acoustic attenuation and the water transmission rate provided by the seal as well as excellent biocompatibility for extended skin contact and a very high compliance to avoid pressure on the skin wall. It is a further object to provide for such seal.

According to the invention, these objects are achieved by a method and a seal as described below.

The invention is beneficial in that, by embedding, prior to molding of the seal, sacrificial particles having a size from 50 to 250 µm into a silicone rubber matrix and removing the sacrificial particles from the matrix in a solvent after molding of the seal, physical properties of the seal, such as the mechanical compliance, the acoustic attenuation and the water transmission rate, can be controlled by selecting the size and/or the concentration and/or the distribution of the sacrificial particles, since thereby the amount of pores, the size of the pores and the distribution of the pores can be controlled accordingly. In particular, the method of the invention allows physical properties of the seal to be tailored in a simple and reliable manner with high reproducibility of the attained physical properties, so that high product quality and yield is obtained at low manufacturing effort, resulting in high output and low cost. In particular, the manufacturing process of the invention is very flexible; for example, the physical properties may be adjusted to the respective size of the seal. Further, the method of the invention allows a desired surface roughness of the seal to be obtained in a controlled manner.

Due to the high reproducibility of the manufacturing method of the invention, tight specifications can be addressed without the need for individual inspection and measurement of physical properties of the manufacturing product.

Preferred embodiments of the invention and examples of the invention will be described below with reference to the accompanying drawings.

DETAILED DESCRIPTION OF THE INVENTION

Figure 1:
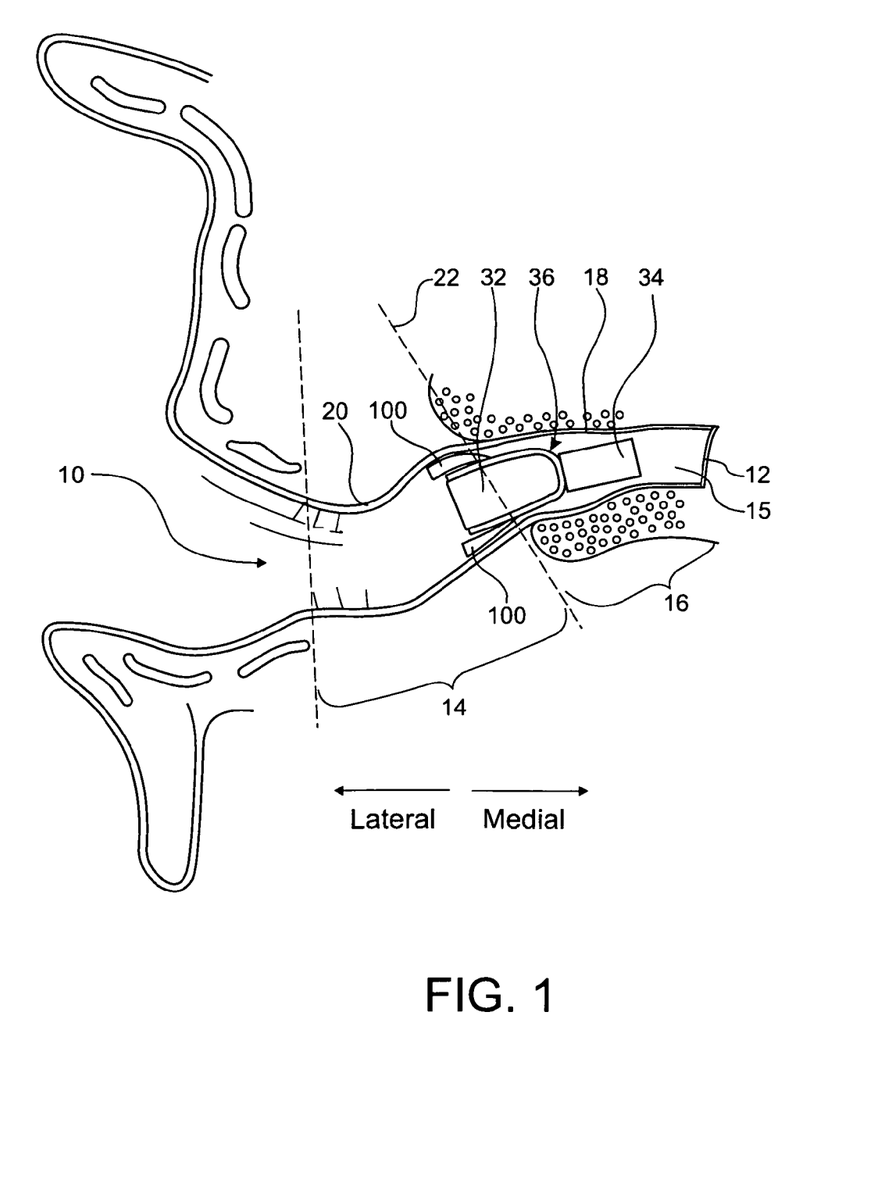
FIG. 1 is a lateral view of an example of a hearing aid according to the invention when positioned in the bony portion of the ear canal.

As shown in FIG. 1, the ear canal 10 comprises, in its lateral part (i.e., away from the tympanic membrane 12), a cartilaginous region 14, which is relatively soft due to the underlying cartilaginous tissue, and in its medial part (i.e. towards the tympanic membrane 12), a bony region 16, which is relatively rigid due to the underlying bony tissue. The skin 18 of the bony region 16 is relatively thin and more sensitive to touch or pressure than the skin 20 in the cartilaginous region 14. There is a characteristic bend in the ear canal 10, which roughly occurs at the bony-cartilaginous junction 22 separating the regions 14, 16.

The CIC hearing aid 30 shown in FIG. 1 comprises a lateral module 32, a medial module 34 and a flexible joint assembly 36 connecting the medial end of the lateral module 32 and the lateral end of the medial module 34. Typically, the lateral module 32 comprises at least one microphone for capturing audio signals from ambient sound, an audio signal processing unit for processing the audio signals, a power amplifier, a battery for supplying power to the electrical components of the lateral module 32 and a housing, whereas the medial module 34 comprises a loudspeaker and a housing, with a wire connection electrically connecting the lateral module and the medial module in order to supply to the processed and amplified audio signals to the speaker (the elements of the modules 32, 34 are not shown in FIG. 1). The flexible joint assembly 36 enables pivoting movement of the medial module 34 relative to the lateral module 32, so that the hearing aid 30 can follow the shape of the ear canal 10 when being inserted into the ear canal 10. In other words, during and after insertion of the hearing aid 30 into the ear canal 10, the module 32 and 34 may take an angled position relative to each other.

This can be seen in FIG. 1, wherein the hearing aid 30 is shown in its angled position in the ear canal 10, wherein the medial module 34 is located at a position in the bony part 16 of the ear canal close to the tympanic membrane 12, while the lateral module 32 is located in part in the cartilaginous region 14 and in part in the bony region 16. When the shape of the ear canal 10 in the cartilaginous region 14 changes due to actions like speaking or chewing, the hearing protection device 30 may follow such changes at least to some extent due to the flexibility of the joint assembly 36.

The hearing aid 30 also comprises at least one retaining seal which can be coaxially positioned with respect to the lateral module 32 and/or the medial module 34. In the example of FIG. 1 a retaining seal 100 is shown which surrounds the lateral module 32.

Figure 4:
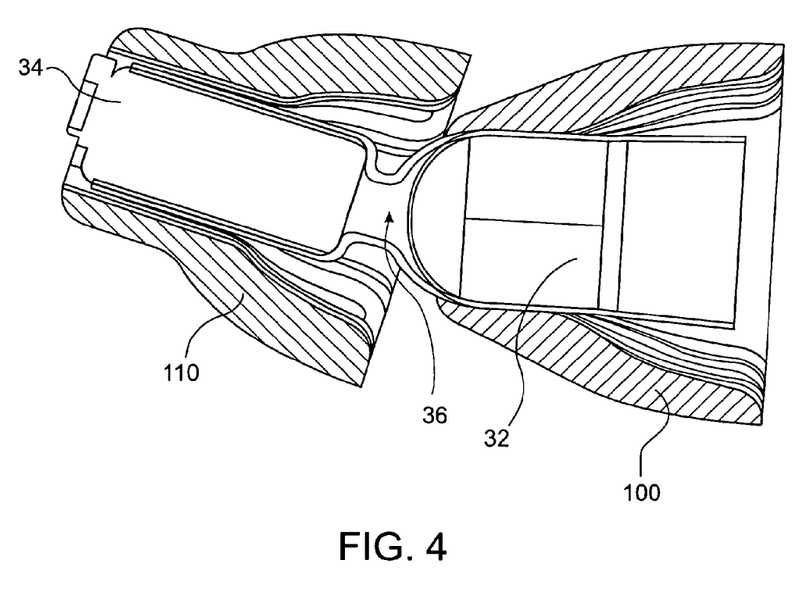
FIG. 4 is a side view of another example of a hearing aid according to the invention.

In FIG. 4, an example is shown wherein a first retaining seal 100 surrounds the lateral module 32 and a second retaining seal 110 surrounds the medial module 32.

The seal is configured to provide for the primary support for the hearing aid 30 within the ear canal 10. The seal is also configured to substantially surround portions of the hearing aid 30 to protect it from contact with the walls of the ear canal 10, and thus, exposure to cerumen, moisture and other contaminants. To this end, the seal can be configured to substantially conform to the shape of the walls of the ear canal, including those in the bony region, and to retain the hearing aid securely within the ear canal 10. Further, the seal is configured to act as an acoustic seal (for preventing feedback) by providing for a certain acoustic attenuation of sound impinging on the seal. The seal also may be configured to dynamically conform to changes in the shape of the ear canal (such as might occur during head movement, chewing, etc.) and still securely retain the hearing aid 30 within the ear canal.

Figure 3:
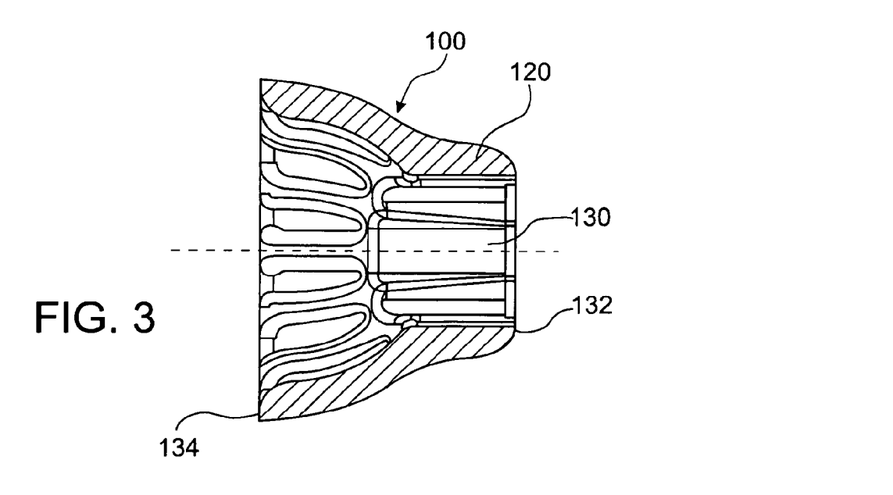
FIG. 3 is a side view of an example of a seal according to the invention which may be used with the hearing aid shown in FIG. 1.

According to the example shown in FIG. 3, the seal 100 includes a shell 120 having an opening 130 for receiving the respective module 32 or 34, wherein the opening may be centrally placed with respect to the shell 120 at a medial apex 132 of the shell 120. Preferably, the opening 130 is concentric with respect to the shell 120 in order to facilitate the centering of the hearing aid 30 in the ear canal. The diameter of the opening 130 may be in the range of 0.5 to 1.5 mm.

Preferably, the shell 120 has a dome-like shape having an apex 132 oriented toward a medial direction of the ear canal 10. The cross-sectional profile of the shell 120 preferably is oval having a short diameter from about 4.5 to 9 mm and a long diameter from about 7.25 to 15 mm (as measured in the plane of the maximum cross-sectional area, i.e. at the lateral end of the shell 120).

The axial length of the seal 100 may be from 5 to 20 mm, preferably from 7 to 17 mm and more preferably from 5 to 10 mm.

Typically, in order to facilitate insertion of the hearing aid 30 into the ear canal 10, the lateral dimension of the shell 120 is smaller at the medial end 132 than at the lateral end 134.

Figure 2:
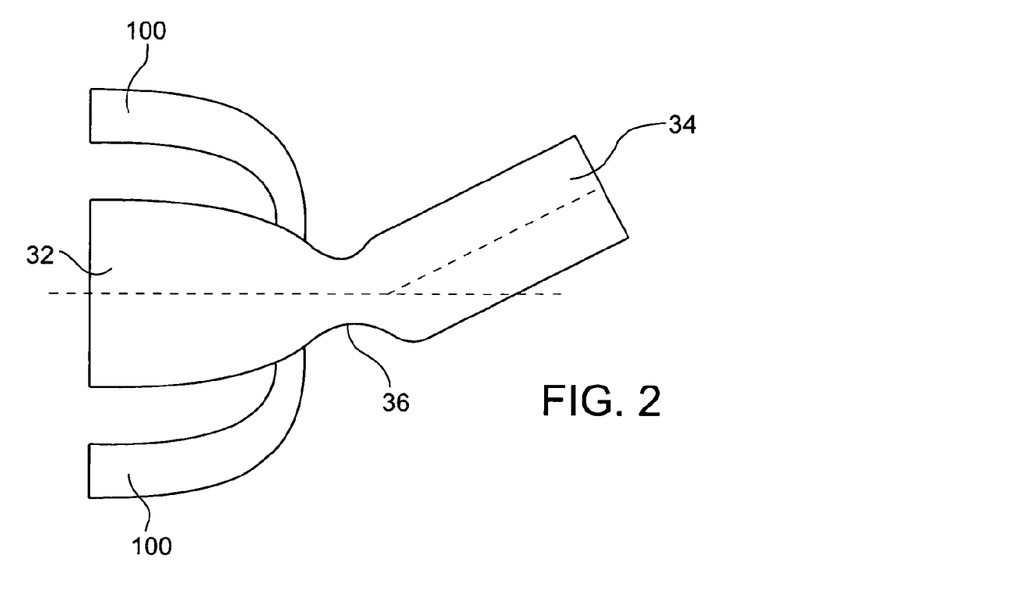
FIG. 2 is an enlarged schematic view of the hearing aid shown in FIG. 1.
Figure 5:
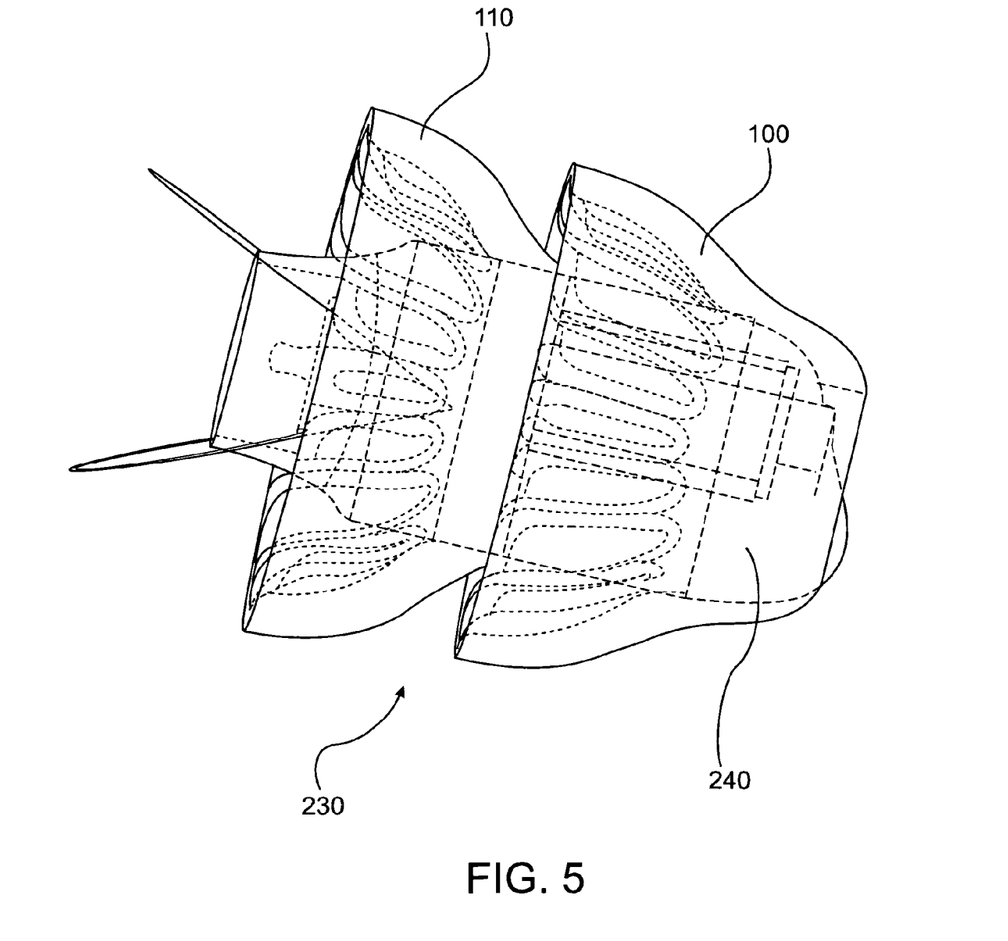
FIG. 5 is a side view of still another example of a hearing aid according to the invention.

An alternative example of a hearing aid comprising a seal according to the invention is shown in FIG. 5, wherein the hearing aid 230 comprises only a single module 240 which combines all hearing aid components of the lateral module 32 and the medial module 34 of the hearing aids of FIGS. 1, 2 and 4. The module 240 is provided with a first retaining seal 100 and a second retaining seal 110 which both surround the module 240 and which are spaced apart in the axial direction of the module 240. As such, after insertion of the hearing aid into the ear canal, the placement of seals 100, 110 of FIG. 5 with regard to the ear canal is similar that of the retaining seals 100, 110 of FIG. 4.

In general, the retaining seals to used in two-module hearing aid embodiments (like that shown in FIGS. 1, 2 and 4) may have similar or identical design as the retaining seals be used in single-module hearing aid embodiments (like that shown in FIG. 5).

The seal is designed to provide for an acoustic attenuation of at least 20 dB, preferably at least 30 dB, in a frequency range within 200 Hz and 6 kHz, when the hearing aid is inserted into the ear canal. Thereby, acoustic feedback caused by sound transmitted from the speaker of the hearing aid to the microphone of the hearing aid is substantially eliminated.

The seal should provide for a water vapor transmission rate (MVTR) of at least 0.01 mg/h/mm$^2$ at 37° C. to keep moisture accumulation in the closed volume 15 of the ear canal low.

Typically, the hearing aid is placed so deep into the ear canal that the medial end of the hearing aid is spaced by about 3 mm to 4 mm from the tympanic membrane 12.

Typically, such type of hearing aids ("extended wear type") is to be worn in the ear canal continuously for at least 2 months, up to 4 months or more. The elasticity (mechanical compliance) of the seal has to be such that the pressure on the ear canal walls upon compression or deformation of the ear canal does not exceed a certain minimal pressure. Further, the seal has to be designed such that the local pressure on the ear canal wall is smaller than the venous capillary return pressure (i.e., 12 mm Hg).

The surface roughness of the seal has to be such that it provides for a sufficient surface friction to the surrounding skin on the ear canal walls in order to avoid outward migration of the hearing aid. Preferably, the surface roughness is about Ra=5 μm.

Further, the material of the seal has to fulfill the requirements of skin biocompatibility with regard to ISO 10993-1.

The device is configured to allow static pressure equalization between ambiance and the closed residual volume in the ear canal.

The material of the seal has to be durable/resistant in the sense that it does not show degradation or change of structural integrity in prolonged contact with sweat, ear wax and soapy water.

Examples of CIC hearing aids of such a type can be found in U.S. Pat. No. 7,580,537 B2 and U.S. Patent Application Publication 2007/0036379 A1, which are hereby incorporated by reference.

The present invention relates to a specific type of retaining seals and a specific method of manufacturing such seals. According to the invention, retaining seals are manufactured by embedding sacrificial particles of a defined size into a silicone rubber matrix, which is preferably hydrophobic, molding the silicone rubber matrix into a desired shape by using a mold, curing the silicone rubber matrix, removing the sacrificial particles from the silicone rubber matrix by leaching out the sacrificial particles in a solvent, and drying the silicone rubber matrix. The sacrificial particles have a size of at least 50 μm and not more than 250 μm, and the silicone rubber matrix preferably has a hardness of less than 20 Shore A. The concentration and the size of the sacrificial particles is selected such that a porosity of at least 40% is achieved. Further, the size and/or the concentration of the sacrificial particles is selected such that the seal provides for an acoustic attenuation of at least 20 dB in a frequency range between 200 Hz and 6 kHz and preferably for a water transmission rate of at least 0.01 mg/h/mm$^2$ at 37° C. Also, the size and/or concentration of the sacrificial particles combined with a given wall thickness is to be selected such that a compliance of the seal of at least 50 mm/N is achieved.

Preferably, the sacrificial particles are salt particles, such as NaCl particles. Preferably, the solvent used for leaching out the sacrificial particles is water, wherein the temperature of the solvent during the leaching out step preferably is from room temperature to 80° C., such as 60° C. for NaCl particles.

Preferably, the size and/or concentration of the sacrificial particles is selected such that a surface roughness of the seal of at least Ra=5 μm is obtained.

Preferably, the size and concentration of the sacrificial particles is selected such that the seal provides for an acoustic attenuation of at least 30 dB in a frequency range between 200 Hz and 6 kHz when the hearing aid is inserted into the ear canal.

The local wall thickness of the seal may be below 0.3 mm and may suddenly (i.e. on a very short range) increase to up to 1.5 mm and more. Also, the shape of the seal may include geometric features which are smaller than 0.3 mm.

According to one embodiment, the silicone rubber matrix may be molded into the desired shape by using a compression molding process.

According to an alternative embodiment, the silicone rubber matrix may be molded into the desired shape by using a liquid silicone rubber (LSR) injection molding process.

The silicone rubber matrix may be cured using a temperature curing process or RTV (room temperature vulcanizing) curing.

The LSR molding process may form part of a multi-component, in particular two-component, injection molding process.

In an injection molding process the porous silicone rubber material of the seal may be combined with a component made of non-porous silicone.

Further, in the injection molding process a hard functional component of the hearing aid may be over-molded with the porous silicone rubber material of the seal. In this case, it has to be ensured that the solvent used for washing out the sacrificial particles does not damage the bonding to the hard component or the hard component itself.

By selecting the size and/or concentration and/or distribution of the sacrificial particles the individual properties of the seal may be adjusted according to its intended function. For example, the porosity of the seal may be adjusted according to its size, i.e., larger seals may have a porosity different from that of smaller seals. In particular, such tailoring via selection of the size and/or concentration or distribution of the sacrificial particles may be used for imparting different physical properties to the medial seal (i.e., the seal of the medial module) and the lateral seal (i.e., the seal at the lateral module). In this case, the seal of the lateral module has a porosity and/or pore size which is different from that of the medial module. In particular, the porosity and/or pore size may be selected such that the compliance of the seal of the medial module is higher than that of the seal of the lateral module, so that the medial seal has a very high compliance, whereas the lateral seal has a medium compliance. Further, the medial seal may be designed to have a higher water vapor transmission rate than the seal of the lateral module (for example, very high versus medium). Also, the seals may be designed such that the sound attenuation of the medial seal is lower than that of the lateral seal (medium attenuation versus very high attenuation).

According to one embodiment, the size and/or concentration of the sacrificial particles may be constant over an entire seal, so that also the porosity is constant. According to an alternative embodiment, the pore size and porosity/pore distribution may be different for different portions of the seal.

Figure 6:
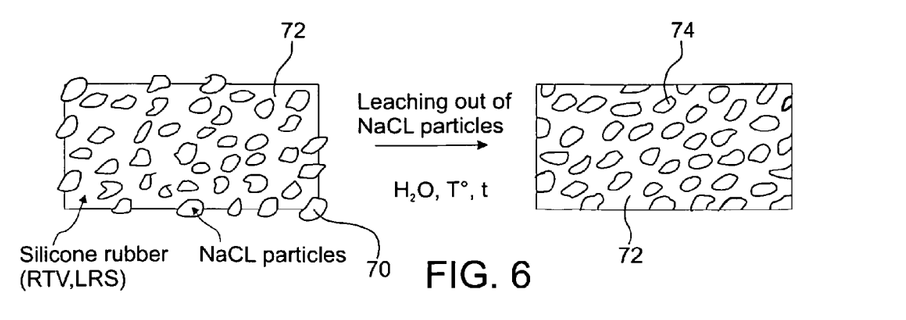
FIG. 6 is a schematic illustration of the removal of sacrificial particles during manufacturing of a seal according to the invention.

In FIG. 6, it is schematically shown how a silicone rubber matrix of a seal looks like during the molding step (left hand side), wherein NaCl particles 70 are embedded in a silicone rubber matrix 72, and how the matrix 72 looks like after the particles 70 have been leached out by water (right hand side) with the removed particles leaving pores 74 in the matrix 72.

Figure 7:
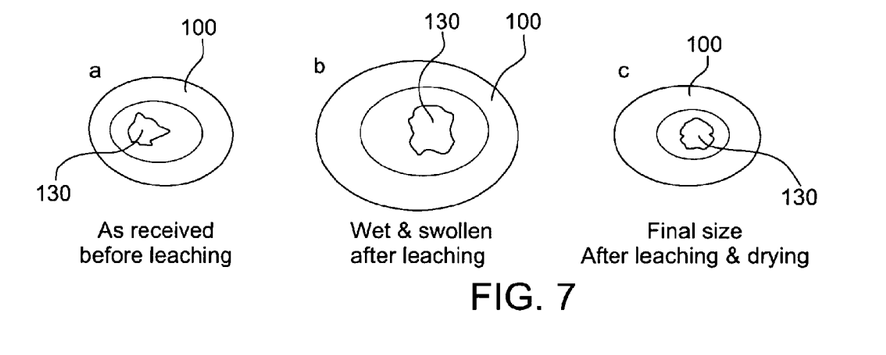
FIGS. 7(a) to 7(c) are cross-sectional views of an example of a seal during manufacturing, wherein 7(a) shows the seal before leaching of the sacrificial particles, 7(b) shows the seal during leaching of the sacrificial particles, and 7(c) shows the seal after leaching and drying.

In FIG. 7(a), a porous seal 100 is shown after the molding step, with the particles remaining within the silicone rubber matrix (RTV silicone was mixed with 38% NaCl particles of a pore size of less than 100 μm); FIG. 7(b) shows a cross-section of the seal 100 during the leaching step, with the dimensions of the seal 100 being significantly increased due to the swelling caused by osmotic pressure during leaching; and FIG. 6(c) shows the seal 100 in its final size after leaching and drying of the remaining porous silicone rubber matrix, wherein the seal 100 returns to its nominal size after drying.

Figure 8:
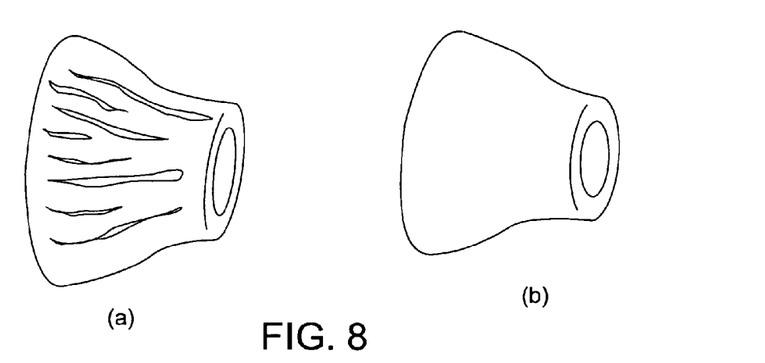
FIGS. 8(a) and 8(b) are side views of a seal produced by a conventional process and a seal produced by a process according to the invention, respectively.

FIG. 8(a) shows a seal manufactured from a silicone matrix without the use of sacrificial particles, while FIG. 8(b) shows a seal manufactured by using the same mold as in FIG. 8(a), but by embedding sacrificial particles into the silicone matrix during molding. It can be seen that the process of the invention results in an increased surface roughness. The porosity can only be assumed by the change of diffraction.

Compliance, MVTR and attenuation values for a silicone retaining seal can be greatly influenced by the size and concentration of the sacrificial particles (resulting in a corresponding size and concentration of pores).

Compliance is reduced by the addition of particles. The compliance reduction goes linearly with the particle/pore content for a porosity of up to about 50%; for higher porosity compliance reaches a plateau. The compliance reduction is easier to control if large particles (>100 μm) are used. As an example, the compliance of a seal made from 7 Shore A RTV silicone rubber (Silpuran 2400, of Wacker Chemie AG, Germany) is increased by 300% if NaCl particles of a size of about 50 to 100 μm are added at 60% weight.

For the specific MVTR the particle content/porosity is more relevant than the pore size. It has been shown that the MVTR of a silicone seal can be increased by 400% by adding NaCl particles at a filling degree of 60%, while the size of the particles did not have a major impact on MVTR when different particles size distributions between 0 and 100 μm were added.

On the other hand, acoustic attenuation of a single seal is slightly reduced by increasing porosity. However, the impact on the whole system is more significant, mostly due to the lower stiffness of higher compliance. It is assumed that the whole device can become a vibrating mass in the ear, suspended by soft springs, and thus vibrates at frequencies and amplitudes that are in the amplification frequency range of 500 Hz to 3000 Hz. Therefore, the compliance reduction of the seals should be compensated by design measures in order to control the dynamic behavior of the seals.

What is claimed is:

1. A method of manufacturing an acoustic seal (100, 110) for retaining a CIC hearing aid (30, 230) within a portion of the ear canal (10) by contact with the wall (20) of the ear canal, comprising the steps of:
   embedding sacrificial particles (70) having a size of at least 50 μm and not more than 250 μm into a silicone rubber matrix (72), wherein the concentration and the size of the sacrificial particles is selected such that a porosity of at least 40% is achieved;
   molding the silicone rubber matrix into a desired shape by using a mold and curing the silicone rubber matrix;
   removing the sacrificial particles from the silicone rubber matrix by leaching out the sacrificial particles in a solvent; and
   drying the silicone rubber matrix;
   wherein the seal is designed to surround at least part of the hearing aid and wherein the seal is designed, by selection of at least one of the size, the concentration, and the distribution of the sacrificial particles, to provide for an acoustic attenuation of at least 20 dB in a frequency range between 200 Hz and 6 kHz, when the hearing aid is inserted into the ear canal, and for a compliance of at least 50 mm/N.

2. The method of claim 1, wherein the sacrificial particles (70) are salt particles.

3. The method of claim 2, wherein the sacrificial particles (70) are NaCl particles.

4. The method of claim 2, wherein the solvent is water.

5. The method of claim 1, wherein the temperature of the solvent is from 20° C. to 80° C.

6. The method of claim 1, wherein in said step of molding the silicone rubber matrix (72) into a desired shape a compression molding process is utilized.

7. The method of claim 1, wherein in said step of molding the silicone rubber matrix (72) into a desired shape a liquid silicone rubber injection molding process is utilized.

8. The method of claim 7, wherein, in said step of molding the silicone rubber matrix into a desired shape, one of a temperature curing process and a RTV (room temperature vulcanizing) curing is utilized.

9. The method of claim 7, wherein the liquid silicone rubber injection molding process forms part of a two-component injection molding process.

10. The method of claim 7, wherein in said injection molding process the porous silicone rubber material of the seal is combined with a component made of non-porous silicone.

11. The method of claim 7, wherein, in said injection molding process, a hard component of the hearing aid (30, 230) having a hardness of at least 40 Shore A is overmolded with the porous silicone rubber material of the seal (100, 110).

12. The method of claim 1, wherein the size and/or the concentration of the sacrificial particles (70) is selected as a function of the dimensions of the seal (100, 110).

13. The method of claim 1, wherein at least one of the size the concentration of the sacrificial particles (70) is constant over the entire seal (100, 110).

14. The method of claim 1, wherein the seal (100, 110) provides, when the hearing aid (30, 230) is inserted into the ear canal (10), for an acoustic attenuation of at least 30 dB in a frequency range between 200 Hz and 6 kHz.

15. The method of claim 1, wherein the seal (100, 110), by selection of at least one of the size, the concentration and the distribution of the sacrificial particles, provides a water vapor transmission rate of at least 0.01 mg/h/mm$^2$ at 37° C.

16. The method of claim 1, wherein the silicone rubber matrix has a hardness of less than 20 Shore A after removal of the sacrificial particles.

17. A CIC hearing aid comprising a body and at least one seal for retaining the body within a portion of the ear canal by contact with a wall of the ear canal, wherein the seal is made of a silicone rubber material having a porosity of at least 40%, with a pore size of at least 50 μm and not more than 250 μm, wherein the seal is adapted to surround at least part of the hearing aid and wherein the seal is adapted to provide for an acoustic attenuation of at least 20 dB in a frequency range between 200 Hz and 6 kHz, when the hearing aid is inserted into the ear canal, and has a compliance of at least 50 mm/N.

18. The hearing aid of claim 17, wherein the body of the hearing comprises a lateral module (32), a medial module (34) and a flexible joint assembly (36) connecting the medial end of the lateral module and the lateral end of the medial module in such a manner that the lateral module and the medial module are movable relative to each other.

19. The hearing aid of claim 18, wherein at least one of the lateral module (32) and the medial module (34) is provided with said at least one seal (100, 110) and wherein said silicone rubber material has a hardness of less than 20 Shore A.

20. The hearing aid of claim 19, wherein said at least one seal comprises a first seal on the lateral module and a second seal on the medial module, and wherein the first seal (100) of the lateral module (32) has at least one of a porosity and a pore size which is different from that of the second seal (110) of medial module (34).

21. The hearing aid of claim 20, wherein the compliance of the second seal (110) of the medial module (34) is higher than that of the first seal (100) of the lateral module (32).

22. The hearing aid of claim 21, wherein second seal has a water vapor transmission rate that is higher than that of the first seal (100) of the lateral module (32).

23. The hearing aid of claim 20, wherein the second seal (110) of the medial module (34) has a sound attenuation that is lower than that of the first seal (100) of the lateral module (32).

24. The hearing aid of claim 17, wherein the hearing aid (30) is sized and shaped to be worn in the ear canal (10) in a manner that a medial end of the hearing aid is located not more than 4 mm from the tympanic membrane (12).

25. The hearing aid of claim 17, wherein said at least one seal comprises at least two seals and comprises a single module (240) which is provided with two of the at least two seals (100, 110), and wherein the two seals are arranged axially spaced apart on the module.

* * * * *